Feb. 16, 1926. 1,573,664
R. W. WETHERILL
STORAGE AND RECLAIMING SYSTEM
Filed Oct. 6, 1925 4 Sheets-Sheet 1
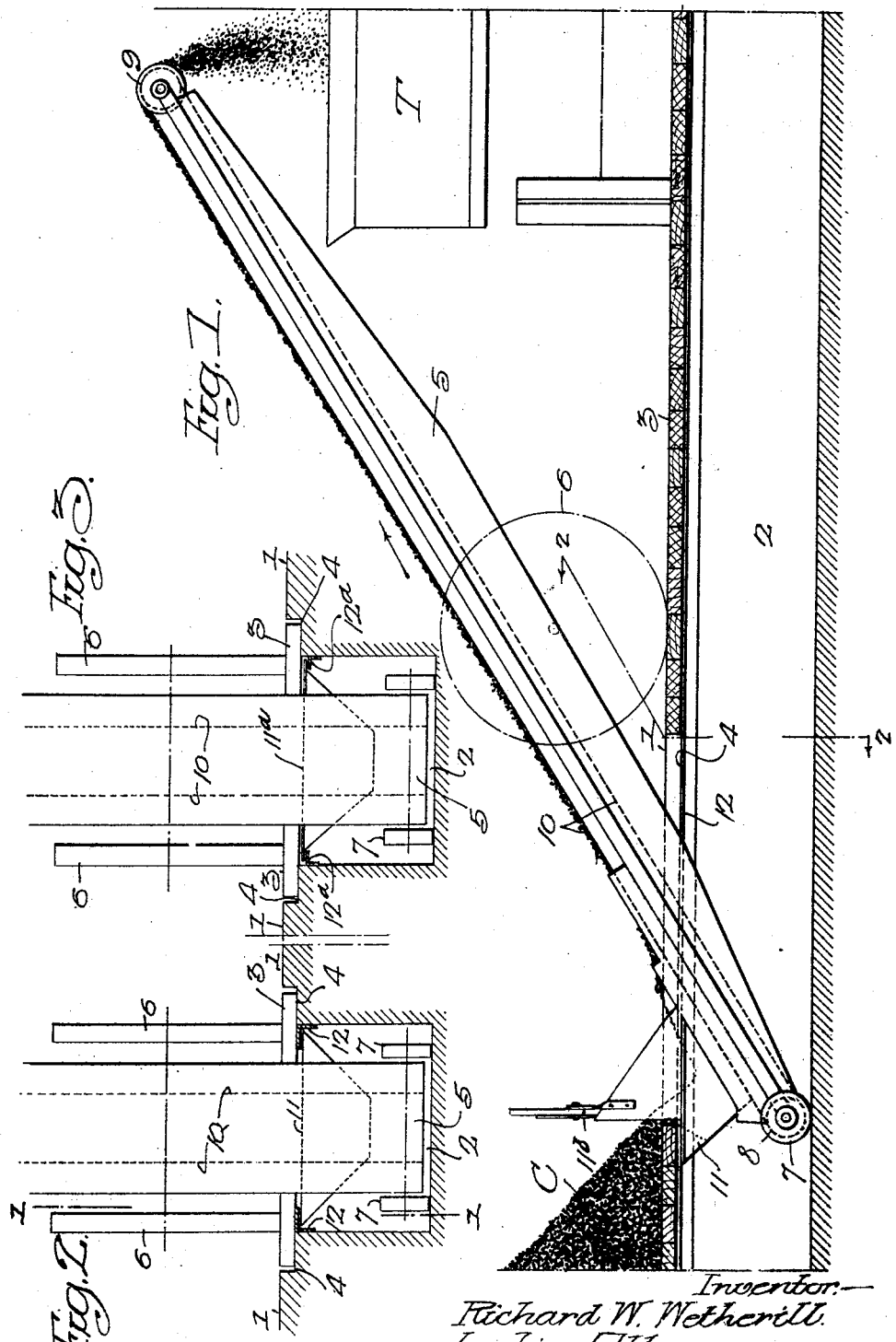

Feb. 16, 1926.
R. W. WETHERILL
STORAGE AND RECLAIMING SYSTEM
Filed Oct. 6, 1925
1,573,664
4 Sheets-Sheet 2
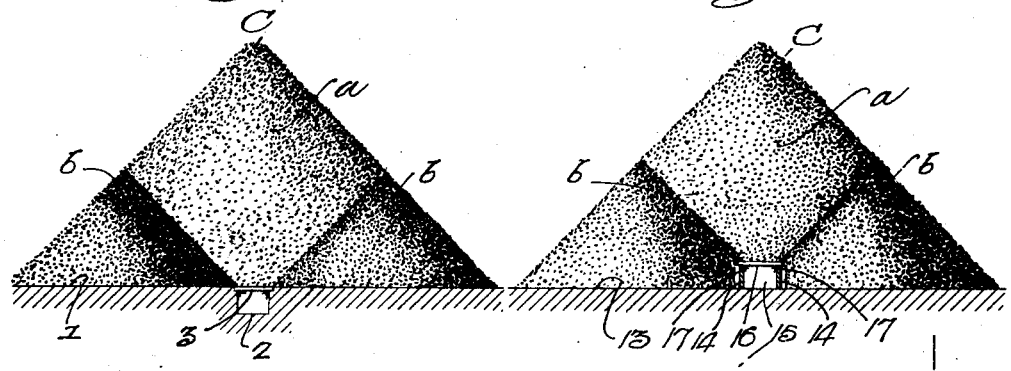
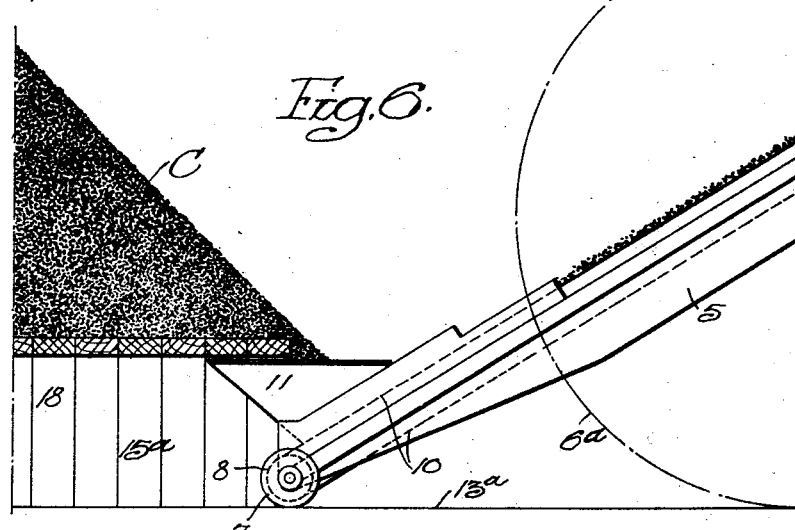
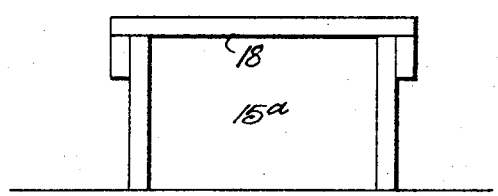
Inventor:
Richard W. Wetherill
by his Attorneys
Howson & Howson

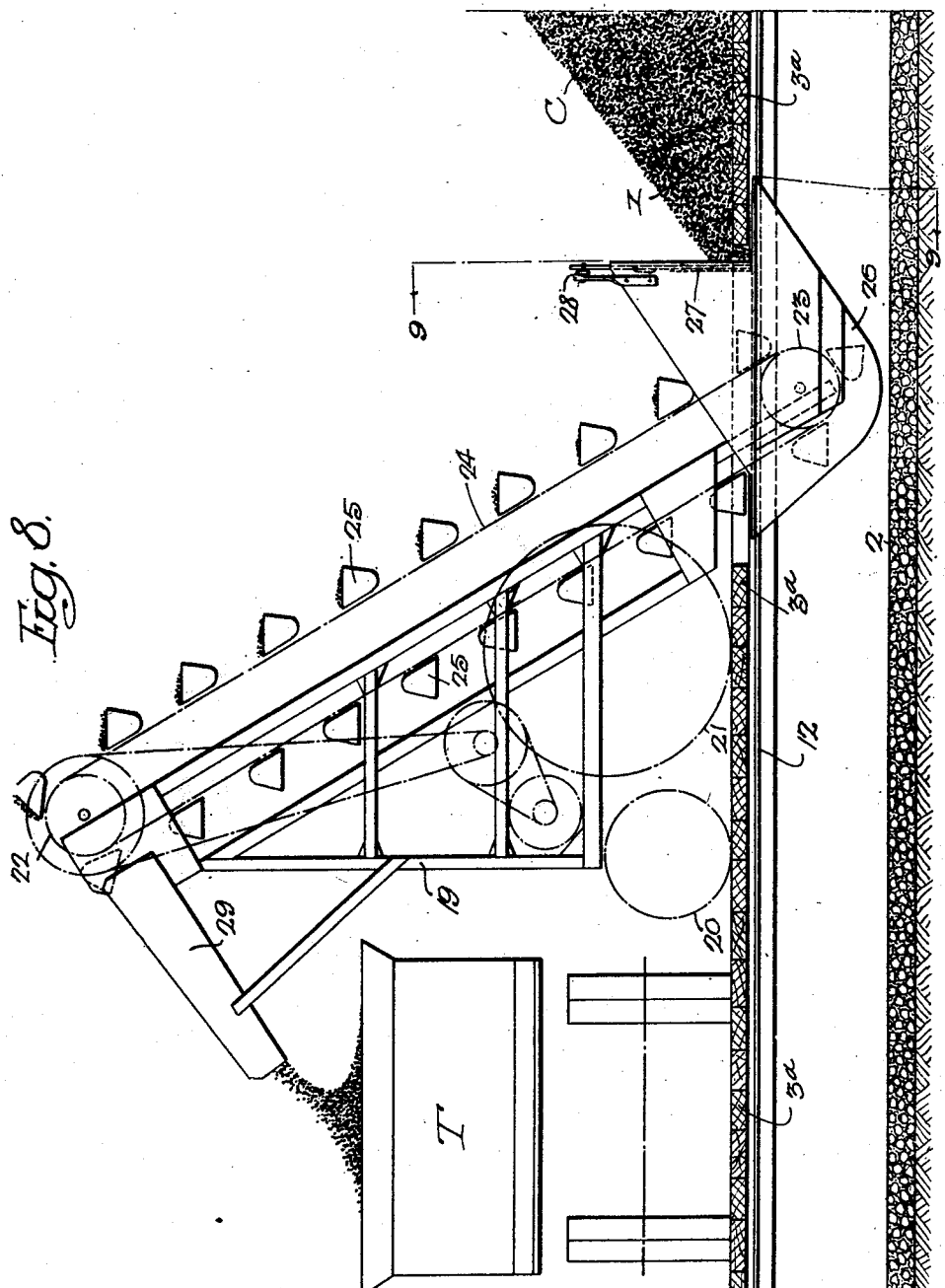

Feb. 16, 1926.
R. W. WETHERILL
STORAGE AND RECLAIMING SYSTEM
Filed Oct. 6, 1925
1,573,664
4 Sheets—Sheet 4
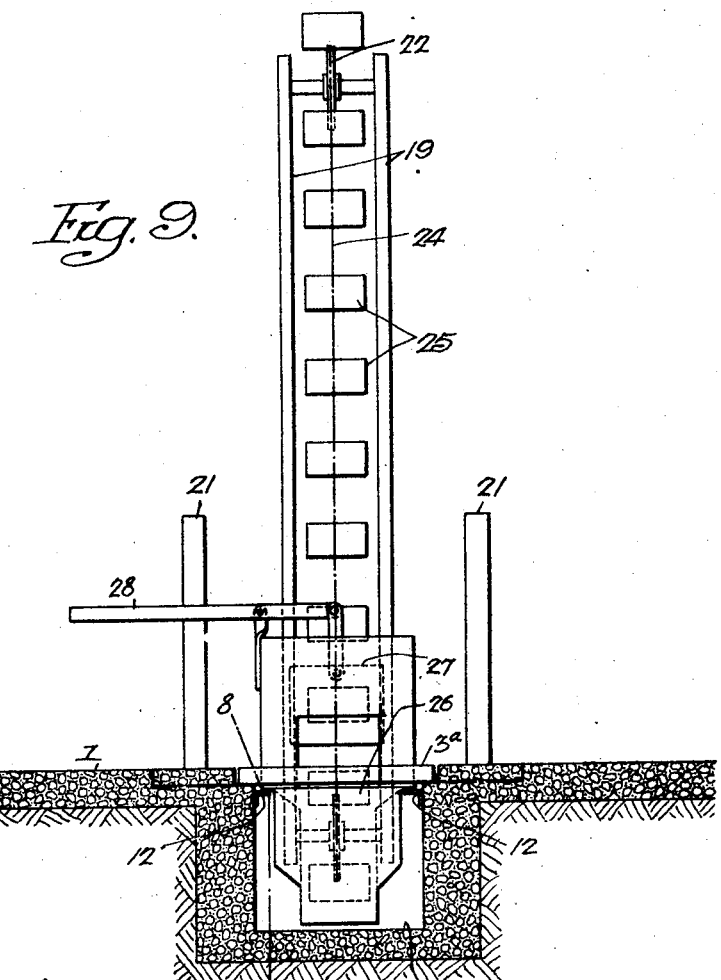
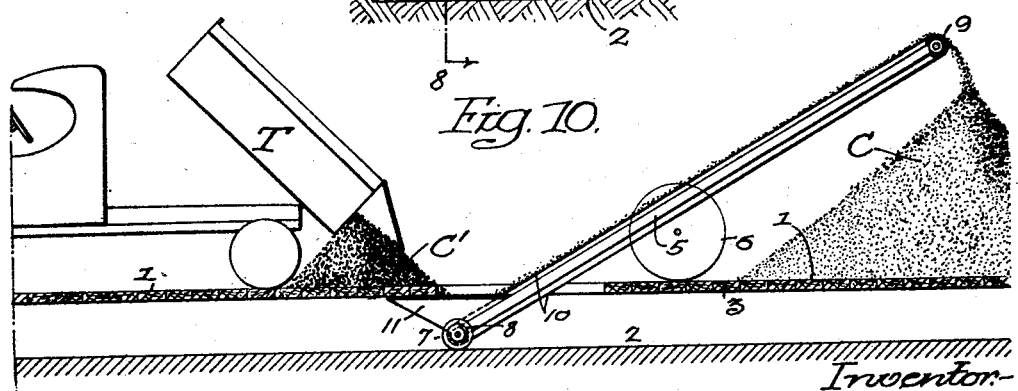
Inventor:
Richard W. Wetherill.
by his Attorneys
Howson & Howson Patented Feb. 16, 1926.

1,573,664

UNITED STATES PATENT OFFICE.

RICHARD WAYNE WETHERILL, OF PHILADELPHIA, PENNSYLVANIA.

STORAGE AND RECLAIMING SYSTEM.

Application filed October 6, 1925. Serial No. 60,843.

*To all whom it may concern:*

Be it known that I, RICHARD WAYNE WETHERILL, a citizen of the United States, residing in Philadelphia, Pennsylvania, have invented the Storage and Reclaiming Systems, of which the following is a specification.

This invention relates to a system of storing and reclaiming coal or other loose or bulk material, such as sand, gravel, crushed rock and the like. It will be understood, however, that the invention may have certain other applications as will hereinafter more fully appear.

The principal object of the invention is to provide a system wherein the cost of construction and maintenance is low and wherein a large proportion of the coal or other material may be conveniently reclaimed or loaded mechanically and without manual handling. In accordance with the invention hand shoveling is reduced to an extreme minimum. A further object of the invention is to provide a system which permits a portable loader to be used at will at any part of a large storage area, the loader operating more effectively and conveniently than has been heretofore possible.

Other objects of the invention are to provide certain improved details of construction whereby the foregoing major objects are attained and whereby greater convenience and increased efficiency are secured. Still other objects of the invention will be apparent from the following specification and claims.

In the accompanying drawings, I have illustrated several embodiments of the invention, these embodiments having been selected for the purpose of showing the scope of the invention and the different applications thereof. It is to be understood, however, that the drawings are for illustrative purposes only and that various changes and substitutions may be made within the scope of the appended claims without departing from the spirit of the invention.

Of the drawings:

Fig. 1 is a combined elevational and vertical sectional view of a system embodying the invention, this view being partly in section along the line 1—1 of Fig. 2.

Fig. 2 is a combined elevational and vertical sectional view, this view being taken along the line 2—2 of Fig. 1.

Fig. 3 is a view similar to Fig. 2 but showing a somewhat different embodiment of the invention.

Fig. 4 is a diagrammatic view on a reduced scale showing the extent to which a pile of coal, or similar material, may be removed by the mechanism without hand shoveling.

Fig. 5 is a view similar to Fig. 4 but showing an alternate form of the invention.

Figs. 6 and 7 are fragmentary views similar respectively to Figs. 1 and 2 and showing another alternate form of the invention.

Fig. 8 is a combined elevational and sectional view in some respects similar to Fig. 1, but showing a loading conveyor of the bucket type instead one of the endless belt type. This view is partly in section along the line 8—8 of Fig. 9.

Fig. 9 is a fragmentary combined elevational and vertical sectional view, this view being taken along the line 9—9 of Fig. 8.

Fig. 10 is a view on a reduced scale, in some respects similar to Fig. 1 and showing the system in use for the storing of coal, or similar material, instead of for the reclaiming thereof.

In accordance with the invention, I provide a channel which extends horizontally underneath a pile of coal, this channel being adapted to contain the receiving end of a suitable portable elevating loader or conveyor. The upper part of the means forming the channel comprises a series of removable sections which may be separately removed from time to time as the surface of the pile of coal recedes and as it becomes necessary to bodily advance the conveyor toward the coal pile.

The location and the mechanical construction of the means forming the channel may be varied to suit different conditions, but I ordinarily prefer to construct the channel in the form of a trench located below the floor on which the pile of coal rests. In this case the removable top wall sections of the channel or trench are flush with the floor. Such a construction is shown in Figs. 1 and 2 wherein 1 represents the floor on which coal is piled and 2 represents a channel or trench formed in the floor below the surface level thereof. The floor 1 may be specially prepared or it may, under some circumstances, consist merely of the ordinary ground surface. As illustrated the floor and the side and bottom walls of the trench are all formed of concrete, but it will be understood that this is not essential. The removable top cover sections for the trench 2 are preferably planks 3 which are adapted to be seated in rabbets or recesses 4, 4 at the tops of the sides of the trench. When the planks are in place the top surfaces thereof are flush with the top surface of the floor 1.

As already stated the trench 2 is adapted to contain the receiving end of a suitable conveyor and in Figs. 1 and 2 I have indicated a conveyor of the endless belt type. Inasmuch as the conveyor details do not of themselves form any part of the invention, I have not completely illustrated them. The conveyor comprises an inclined framework 5, which is supported in part by main wheels 6, 6 adapted to rest upon the floor 1 or upon the boards 3. The lower end of the frame 5 is carried by wheels 7, 7 which travel along the bottom of the trench 2. Carried by the opposite ends of the frame 5 are guide rollers 8 and 9 carrying an endless conveyor belt 10. Suitable mechanism (not shown) is provided for operating the conveyor so as to move the belt in the direction indicated.

Cooperating with the conveyor is a hopper 11 which is located in front thereof and which extends transversely across substantially the entire width of the trench. The hopper 11 may be carried by the frame 5 of the conveyor, or it may be entirely separately supported. The hopper 11 may be provided with a vertically adjustable gate 11$^b$ for regulating the flow of material. The gate is preferably separated from the advance edge of the hopper by a distance greater than the width of one of the cover sections 3.

As will be observed from an inspection of Fig. 1, a number of the planks 3 are removed from the top of the trench to permit the conveyor to extend into the trench, and the hopper 11 is located so that it projects under the edge of the coal pile C and under the end plank of the series. The conveyor is located to receive coal from the hopper. As illustrated the coal will slide by gravity into the hopper 11 from which it will be removed by the belt 10 and discharged at the upper end of the conveyor. In the drawing, a truck T is shown in place to receive the coal so discharged. When the surface of the coal pile has receded so that the coal will no longer flow into the hopper by gravity, the conveyor is bodily moved, in this case toward the left, and the outermost plank at the end of the series is manually removed from beneath the coal and replaced at the right hand side of the conveyor. This releases another section of the coal pile which gradually slides into the hopper. This procedure of advancing the conveyor and transferring a plank is repeated so long as the coal reclaiming operation continues. By replacing the same or similar planks at the rear of the opening I avoid increasing the size thereof and provide a floor for the loader wheels to travel upon.

Preferably as shown special provision is made for preventing coal from falling down into the trench between the sides thereof and the edges of the hopper 11. As illustrated in Fig. 2 there are provided two guard rails in the form of angle bars 12, 12 which extend longitudinally along the trench and which projects inward above the edges of the hopper. In Fig. 3, I have shown an alternate construction wherein angle bars 12$^a$, 12$^a$ are provided which project inward immediately below the laterally extended lips of a hopper 11$^a$. In this case the rails may serve to also support the hopper which can be entirely independent of the conveyor frame.

In Fig. 4, I have indicated diagrammatically the extent to which the coal pile may be removed by means of my improved system without any manual shoveling or handling of the coal. It will be clear that the section $a$ of the coal pile will be removed without manual assistance and that the side sections $b$, $b$ will not be so removed. Obviously, however, the sections $b$, $b$ can, if desired, be manually shoveled or pushed into the conveyor hopper from time to time as the hopper is advanced. It will further be obvious that the amount of shoveling can be further reduced by providing two or more trenches.

While it is preferable to locate the beforementioned channel below the surface of the floor so as to provide a normally unobstructed floor surface, there may be circumstances under which it may be desirable to locate the channel above the surface. In Fig. 5, I have shown a construction which comprises a floor 13 upon which are built up walls 14, 14 forming a channel 15 between them. As illustrated these walls 14, 14 are constructed of planks. The channel 15 is closed at the top by means of transverse planks 16 which are similar to the planks 3 already referred to. Angle bars 17, 17 are shown, these being similar in function to the bars 12, 12 already described. The conveyor used in connection with the construction used in Fig. 5 may be identical with that shown in Figs. 1 and 2, the wheels 6, 6 of the conveyor travelling along the planks 16, 16. A comparison between Fig. 5 and Fig. 4 shows that the construction in Fig. 5 is the less advantageous, as more hand shoveling is necessary if it is desired to remove all of the coal. However, this construction shown in Fig. 5, while somewhat inferior to the construction shown in Fig. 4, nevertheless has many advantages over the ordinary present practice.

In Figs. 6 and 7, I have shown another embodiment of the invention similar in some respects to what is shown in Fig. 5. However, instead of removing only the top wall of the channel, I provide a channel which consists entirely of removable sections 18, 18, each section including a top wall and two side walls all permanently connected together. The conveyor is or may be similar to that shown in Fig. 1, except that the wheels 6ª, 6ª are adapted to travel at the same level as the wheels 7, 7, all of the wheels resting upon the floor 13ª. In operation the receiving end of the conveyor is repeatedly advanced into the channel 15ª and successive sections 18 are removed to permit the coal to slide into the hopper. Before removing a section the coal at the sides thereof may have to be shoveled into the conveyor hopper. This construction has an advantage over the construction shown in Fig. 5 in that the floor is not obstructed at points where no coal is piled; but it is subject to the same relative disadvantage as the construction shown in Fig. 5 in that a considerable amount of hand shoveling is necessary if all of the coal is to be removed.

In Figs. 8 and 9, I have shown a construction wherein a bucket type conveyor or loader is used instead of a belt type conveyor. The trench is substantially the same as that shown in Figs. 1 and 3 except that the planks 3ª are somewhat shorter. The conveyor comprises a framework 19 carried by wheels 20 and 21. In this case as shown by full lines in Fig. 9, the wheels may rest directly on the floor 1 instead of on the planks 3ª; or the planks may be longer as shown by dot-and-dash lines so that the wheels rest directly thereon. Guide sheaves 22 and 23 are provided and over these sheaves travels a chain 24 to which are secured elevating buckets 25, 25. Carried by the lower part of the frame 19, and below the level of all of the wheels, is a hopper 26 into which the buckets dip. This hopper projects forward under the edge of the pile of coal. At a short distance behind the forward edge of the hopper 26 is a vertically adjustable door or gate 27 operable by means of a lever 28. By means of this gate the flow of coal into the hopper may be retarded or cut off.

In operation the conveyor is placed as shown and the coal moves by gravity into the hopper, the rate of flow being controlled by the gate 27. The coal entering the hopper is picked up by the successive buckets 25, 25 and discharged by these buckets into a chute 29. As illustrated the chute delivers the coal into a truck T. When the surface of the coal pile recedes one of the planks 3ª is removed and replaced at the left of the conveyor and the entire conveyor is advanced a distance corresponding approximately to the width of the plank thus removed.

While a system embodying my invention is primarily intended for the reclaiming of coal from a pile, it is to be observed that it may be used without modification for piling the coal as it may be delivered to the coal yard by means of trucks or otherwise. Fig. 10 is a diagrammatic view showing a small pile C' of coal which has been dumped by a truck T. The coal from the pile C' is being transferred to the larger pile C by means of an endless belt conveyor. The construction and operation of the system is exactly the same as already described in connection with Figs. 1 and 2, and repetition will be unnecessary.

From the foregoing description, it will be clear that in all of the illustrated embodiments of the invention provision is made for permitting the receiving end of a conveyor, preferably provided with a hopper, to be advanced under the edge of a coal pile. Inasmuch as the hopper advances in an unobstructed channel, the movement thereof under the coal is effected without opposition. Then by removing one section of the covering of the channel some of the coal is permitted to slide by gravity into the hopper, the coal thus being transferred and loaded without manual assistance.

While primarily intended for loose or bulk material such as referred to, the invention is also applicable to the handling of lump material and packages. Such lump material and packages ordinarily would not automatically slide onto the conveyor or loader by gravity, but with the receiving end of the loader below the floor level the lumps or packages can be manually slid onto the conveyor without the necessity of any lifting.

What I claim is:

1. In a storing and loading system, the combination with a floor, of means forming a trench below the floor level, a series of transversely extending narrow cover sections for the trench flush with the floor and adapted to be separately removed to uncover different parts of the trench, and an elevating conveyor having its receiving end adapted to extend into the said trench below the floor level and underneath the cover section at the end of the said series, the said conveyor being bodily movable so that it can be periodically advanced as an entirety along the trench as successive cover sections are removed from the end of the said series.

2. In a storing and loading system, the combination with a floor, of means forming a trench below the floor level, a series of transversely extending narrow cover sections for the trench flush with the floor and adapted to be separately removed to uncover different parts of the trench, and an elevating conveyor adapted to extend into the said trench through an opening formed by removing some of the said cover sections with the receiving end thereof underneath the cover section at the front end of the said opening, the said conveyor having its main wheels supported at the floor level and the conveyor being bodily movable so that it can be periodically advanced as an entirety along the trench as successive cover sections are removed from the front end of the said opening and replaced at the rear end thereof.

3. In a storing and loading system, the combination with a floor, of means forming a trench below the floor level, a series of transversely extending narrow cover sections for the trench flush with the floor and adapted to be separately removed to uncover different parts of the trench, and an elevating conveyor adapted to extend into the said trench through an opening formed by removing some of the said cover sections with the receiving end thereof underneath the cover section at the front end of the said opening, the said conveyor having its main supporting wheels resting on the planks at the rear of the said opening and the conveyor being bodily movable so that it can be periodically advanced as an entirety along the trench as successive cover sections are removed from the front end of the said opening and replaced at the rear end thereof.

4. In a system for storing and reclaiming coal and similar material, the combination with a floor on which a pile of the said material may be supported, of means forming a channel immediately adjacent the floor and extending under the said pile, the last said means including a series of transversely extending narrow sections which may be separately removed to uncover the top of the channel, a hopper adapted to be located in the channel and to be movable therealong with its forward end extending underneath the edge part of the pile of material and underneath the removable section at the end of the said series, and an elevating conveyor having its receiving end extending into the said hopper in the channel, the said conveyor being bodily movable with the hopper so that both the hopper and the conveyor can be periodically advanced along the channel and toward the pile as the surface of the pile recedes and as successive sections are removed from the end of the said series.

5. In a system for storing and reclaiming coal and similar materials, the combination with the floor on which a pile of the said material may be supported, of means forming a channel immediately adjacent the floor and extending under the said pile, the last said means including fixed side walls and a series of separately removable transversely extending narrow cover sections for the channel, a hopper adapted to be located in the channel and to be movable therealong with its forward end extending underneath the edge part of the pile of material and underneath the cover section at the end of the said series, and an elevating conveyor having its receiving end extending into the said hopper in the channel, the said conveyor being bodily movable with the hopper so that both the hopper and the conveyor can be periodically advanced along the channel and toward the pile as the surface of the pile recedes and as successive cover sections are removed from the end of the said series.

6. In a system for storing and reclaiming coal and similar material, the combination with a floor on which a pile of the said material may be supported, of means forming a trench below the floor level and extending under the said pile, the last said means including fixed side walls and a series of separately removable transversely extending narrow cover sections having their top surfaces flush with the floor, a hopper adapted to be located in the trench and to be movable therealong with its forward end extending underneath the edge part of the pile of material and underneath the cover section at the end of the said series, and an elevating conveyor having its receiving end extending into the said hopper in the trench, the said conveyor being bodily movable with the hopper so that both the hopper and the conveyor can be periodically advanced along the trench and toward the pile as the surface of the pile recedes and as successive cover sections are removed from the end of the said series.

7. In a system for storing and reclaiming coal and similar material, the combination with a floor on which a pile of the said material may be supported, of means forming a channel immediately adjacent the floor and extending under the said pile, the last said means including fixed side walls and a series of separately removable transversely extending narrow cover sections for the channel, a hopper adapted to be located in the channel and to be movable therealong with its forward end extending underneath the edge part of the pile of material and underneath the cover section at the end of the said series, an elevating conveyor having its receiving end extending into the said hopper in the channel, the said conveyor being bodily movable with the hopper so that both the hopper and the conveyor can be periodically advanced along the channel and toward the pile as the surface of the pile recedes and as successive cover sections are removed from the end of the said series, and guard rails extending longitudinally at both sides of the channel adjacent the path of travel of the hopper to prevent material from falling into the channel at the sides of the hopper.

8. In a system for storing and reclaiming coal and similar material, the combination with a floor on which a pile of the said material may be supported, of means forming a trench below the floor level and extending under the said pile, the last said means including fixed side walls and a series of separately removable transversely extending narrow cover sections having their top surfaces flush with the floor, a hopper adapted to be located in the trench and to be movable therealong with its forward end extending underneath the edge part of the pile of material and underneath the cover section at the end of the said series, an elevating conveyor having its receiving end extending into the said hopper in the trench, the said conveyor being bodily movable with the hopper so that both the hopper and the conveyor can be periodically advanced along the trench and toward the pile as the surface of the pile recedes and as successive cover sections are removed from the end of the said series, and guard rails extending longitudinally at both sides of the trench adjacent the path of travel of the hopper to prevent material from falling into the trench at the sides of the hopper.

9. In a system for storing and reclaiming coal and similar material, the combination with a floor on which a pile of the said material may be supported, of means forming a channel immediately adjacent the floor and extending under the said pile, the last said means including a series of transversely extending narrow sections which may be separately removed to uncover the top of the channel, a hopper adapted to be located in the channel and to be movable therealong with its forward end extending underneath the edge part of the pile of material and underneath the removable section at the end of the said series, an elevating conveyor to which the hopper is connected the said conveyor having its receiving end extending into the hopper and bodily movable therewith so that both the hopper and the conveyor as an entirety can be periodically advanced along the channel and toward the pile as the surface of the pile recedes and as successive sections are removed from the end of the said series, and a vertically adjustable gate associated with the hopper for regulating the flow of material.

10. In a system for storing and reclaiming coal and similar material, the combination with a floor on which a pile of the said material may be supported, of means forming a trench below the floor level and extending under the said pile, the last said means including fixed side walls and a series of separately removable transversely extending narrow cover sections having their top surfaces flush with the floor, a hopper adapted to be located in the trench and to be movable therealong with its forward end extending underneath the edge part of the pile of material and underneath the cover section at the end of the said series, an elevating conveyor to which the hopper is connected, the said conveyor having its receiving end extending into the hopper and bodily movable therewith so that both the hopper and the conveyor as an entirety can be periodically advanced along the channel and toward the pile as the surface of the pile recedes and as successive sections are removed from the end of the said series, and a vertically adjustable gate associated with the hopper for regulating the flow of material.

11. In a system for storing and reclaiming coal and similar material, the combination with a floor on which a pile of the said material may be supported, of means forming a trench below the floor level and extending under the said pile, the last said means including fixed side walls and a series of separately removable transversely extending narrow cover sections having their top surfaces flush with the floor, a hopper adapted to be located in the trench and to be movable therealong with its forward end extending underneath the edge part of the pile of material and underneath the cover section at the end of the said series, an elevating conveyor to which the hopper is connected, the said conveyor having its receiving end extending into the hopper and bodily movable therewith so that both the hopper and the conveyor as an entirety can be periodically advanced along the channel and toward the pile as the surface of the pile recedes and as successive sections are removed from the end of the said series, and a vertically adjustable gate associated with the hopper for regulating the flow of material, the said gate being separated from the advance edge of the hopper by a distance greater than the width of one of the cover sections.

12. In a system for storing and reclaiming coal and similar material, the combination with a floor on which a pile of the said material may be supported, of means forming a trench below the floor level and extending under the said pile, a series of separately removable transversely extending narrow cover sections for the trench flush with the floor and adapted to be separately removed to uncover different parts of the trench, an elevating conveyor having its main wheels supported at the floor level and having its receiving end adapted to extend into the said trench through an opening formed by removing some of the said cover sections, and a hopper connected with the conveyor at the receiving end thereof and adapted to be located in the trench with its forward end extending underneath the edge part of the pile of material and underneath the cover section of the front end of the said opening, the said conveyor and hopper being bodily movable so that they can be periodically advanced along the trench and toward the pile as the surface of the pile recedes and as successive cover sections are removed from the front end of the said opening and replaced at the rear end thereof.

13. In a system for storing and reclaiming coal and similar material, the combination with a floor on which a pile of the said material may be supported, of means forming a trench below the floor level and extending under the said pile, a series of separately removable transversely extending narrow cover sections for the trench flush with the floor and adapted to be separately removed to uncover different parts of the trench, an elevating conveyor having its receiving end adapted to extend into the said trench through an opening formed by removing some of the said cover sections and having its main wheels adapted to be supported on the cover sections at the rear of the said opening, and a hopper connected with the conveyor at the receiving end thereof and adapted to be located in the trench with its forward end extending underneath the edge part of the pile of material and underneath the cover section at the front end of the said opening, the said conveyor and hopper being bodily movable so that they can be periodically advanced along the trench and toward the pile as the surface of the pile recedes and as successive cover sections are removed from the front end of the said opening and replaced at the rear end thereof.

14. In a system for storing and reclaiming coal and similar material, the combination with a floor on which a pile of the said material may be supported, of means forming a trench below the floor level and extending under the said pile, a series of separately removable transversely extending narrow cover sections for the trench flush with the floor and adapted to be separately removed to uncover different parts of the trench, an elevating conveyor having two pairs of wheels supported at the floor level and having its receiving end adapted to extend into the said trench below the floor level through an opening formed by removing some of the said cover sections, and a hopper connected with the conveyor at the receiving end thereof and adapted to be located in the trench with its forward end extending underneath the edge part of the pile of material and underneath the cover section at the front end of the said opening, the said conveyor and hopper being bodily movable so that they can be periodically advanced along the trench and toward the pile as the surface of the pile recedes and as successive cover sections are removed from the front end of the said opening and replaced at the rear end thereof.

15. In a system for storing and reclaiming coal and similar material, the combination with a floor on which a pile of the said material may be supported, of means forming a trench below the floor level and extending under the said pile, a series of separately removable transversely extending narrow cover sections for the trench flush with the floor and adapted to be separately removed to uncover different parts of the trench, an elevating conveyor having its receiving end adapted to extend into the said trench through an opening formed by removing some of the said cover sections and having two pairs of wheels adapted to be supported on the cover sections at the rear of the said opening, and a hopper connected with the conveyor at the receiving end thereof and adapted to be located in the trench with its forward end extending underneath the edge part of the pile of material and underneath the cover section at the front end of the said opening, the said conveyor and hopper being bodily movable so that they can be periodically advanced along the trench and toward the pile as the surface of the pile recedes and as successive cover sections are removed from the front end of the said opening and replaced at the rear end thereof.

16. In a system for storing and reclaiming coal and similar material, the combination with a floor on which a pile of the said material may be supported, of means forming a normally unobstructed trench below the floor level and extending under the said pile, and a series of transversely extending narrow cover sections for the trench flush with the floor and adapted to be separately removed so that an opening into the trench may be formed at any desired position to permit the end of an elevating conveyor to extend into the trench and receive material from the edge portions of the pile of material, successive cover sections being removable from one side of the opening to the other to permit the conveyor to be bodily advanced.

17. In a system for storing and reclaiming coal and similar material, the combination with a floor on which a pile of the said material may be supported, of means forming a normally unobstructed trench below the floor level and extending under the said pile, a series of transversely extending narrow cover sections for the trench flush with the floor and adapted to be separately removed so that an opening into the trench may be formed at any desired position to permit the end of an elevating conveyor to extend into the trench and receive material from the edge portions of the pile of material, successive cover sections being removable from one side of the opening to the other to permit the conveyor to be bodily advanced, and longitudinal guard rails located at the sides of the trench to cooperate with a hopper on the conveyor and prevent material from falling into the trench.

RICHARD WAYNE WETHERILL.